(12) United States Patent
Clavette

(10) Patent No.: US 6,642,631 B1
(45) Date of Patent: Nov. 4, 2003

(54) CIRCUIT AND METHOD OF DIRECT DUTY CYCLE CURRENT SHARING

(75) Inventor: Danny Richard Clavette, Greene, RI (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 348 days.

(21) Appl. No.: 09/690,145

(22) Filed: Oct. 17, 2000

(51) Int. Cl.[7] .................................................. H02J 1/10
(52) U.S. Cl. ......................................... 307/52; 323/282
(58) Field of Search .................. 323/282, 283; 307/44, 52

(56) References Cited

U.S. PATENT DOCUMENTS

| | | | | | |
|---|---|---|---|---|---|
| 4,194,147 | A | * | 3/1980 | Payne et al. ................... | 307/53 |
| 4,355,240 | A | * | 10/1982 | Hamilton ....................... | 307/44 |
| 4,675,588 | A | * | 6/1987 | Talbot .......................... | 318/599 |
| 4,717,833 | A | | 1/1988 | Small | |
| 4,924,170 | A | * | 5/1990 | Henze .......................... | 323/285 |
| 5,157,269 | A | | 10/1992 | Jordan et al. | |
| 5,164,890 | A | * | 11/1992 | Nakagawa et al. ........... | 363/65 |
| 5,428,523 | A | * | 6/1995 | McDonnal .................... | 307/58 |
| 5,604,669 | A | * | 2/1997 | Strong, III ................... | 363/17 |
| 5,764,467 | A | * | 6/1998 | Seo ............................ | 361/91.7 |
| 5,808,453 | A | * | 9/1998 | Lee et al. .................... | 323/272 |
| 5,834,925 | A | * | 11/1998 | Chesavage ................... | 307/58 |
| 6,009,000 | A | * | 12/1999 | Siri ........................... | 363/21.09 |
| 6,215,290 | B1 | * | 4/2001 | Yang et al. .................. | 323/282 |
| 6,404,175 | B1 | * | 6/2002 | Yang et al. .................. | 323/282 |
| 6,449,174 | B1 | * | 9/2002 | Elbanhawy .................. | 323/907 |

FOREIGN PATENT DOCUMENTS

| | | | | |
|---|---|---|---|---|
| DE | 3219754 A1 | * | 12/1982 | ............. H02J/3/46 |
| EP | 0581016 A1 | * | 6/1993 | .......... H02M/3/158 |
| EP | 1061629 A1 | * | 12/2000 | ............. H02J/1/10 |
| EP | 1120897 A2 | * | 8/2001 | ............ H02M/7/48 |
| GB | 2012501 A | * | 7/1979 | .......... H02M/3/335 |

OTHER PUBLICATIONS

Unitrode from Texas Instruments, "UC1902, UC2902, UC3902 Preliminary" Feb. 1999, pp. 1–5.
Unitrode from Texas Instruments, "UC1907, UC2907, UC3907 Load Share Controller" Mar. 1999 (Revised Sep. 2000), pp. 1–7.
Dan Clavette—ON Semconductor., "Implementing Current Sharing for VRM–9.0". Oct. 11, 2000. Pp. 1–6.

* cited by examiner

*Primary Examiner*—Brian Sircus
*Assistant Examiner*—Roberto J. Rios

(57) ABSTRACT

A direct duty cycle current sharing controller (42) and a method for controlling the output current of parallel coupled voltage regulator. A current sense amplifier (58) is provided to amplify the output voltage of a current sensor of a voltage regulator. A share bus amplifier (64) is provided to drive the share bus (SHARE) to a voltage representing the highest voltage regulator current of parallel coupled voltage regulators. A share adjust amplifier (68) provides the error voltage directly to the control terminal of a pulse width modulated (PWM) comparator (52). The share adjust amplifier overrides any feedback voltage currently being provided by the PWM controller and takes direct control over the duty cycle of the drive signal. Direct duty cycle current share control is provided under all modes of operation, even during modes where the voltage regulator is operating out of regulation, such as during soft start.

13 Claims, 3 Drawing Sheets

CIRCUIT AND METHOD OF DIRECT DUTY CYCLE CURRENT SHARING

FIELD OF THE INVENTION

The present invention relates, in general, to current sharing control circuits and, more particularly, to direct duty cycle current sharing control circuits.

BACKGROUND OF THE INVENTION

Current sharing control circuits are typically employed to provide a method whereby several power supplies arranged in parallel provide substantially equal amounts of current to their respective loads. An example of such an arrangement can be found with advanced computer motherboards. Computer motherboards typically contain a central processing unit (CPU), random access memory (RAM) and various peripheral input/output (I/O) capability. Some of the more advanced computer motherboards contain several CPU's for parallel processing, but require a substantial amount of power in return. Each CPU can require as much as 60 amps of current, or more, from the respective power supply voltage input.

In order to supply current to multiple CPU's within the computer, manufacturers have begun to employ multiple voltage regulators operating from a common input voltage supply, arranged in parallel, to supply the high current demands of a multiple CPU load. Regulations governing computer hardware suppliers require multiple voltage regulators arranged in parallel to boost output current drive, to supply current to the load in substantially equal proportion. In order to comply with substantially equal current load regulations, prior art current sharing circuits have been developed. Prior art current sharing techniques typically employ a standard pulse width modulated (PWM) buck converter along with a current sensor to monitor the output current load of each regulator. The current sense information is used to promote current sharing between the parallel connected regulators. Current sharing techniques, however, employed by prior art current sharing circuits, modify either the feedback signal or the reference signal in response to the output current sense to accomplish current sharing. A problem with this technique occurs at start up, when the PWM controllers are not yet operating in regulation. Attempts to promote current sharing among the regulators fail, since current sharing is not possible until the PWM controller is in regulation. PWM controllers typically employ soft start circuitry which limits the duty cycle of the PWM drive signal to a minimum value to avoid saturation or damage at start up. Typical soft start times are on the order of tens to hundreds of milliseconds. During soft start, the prior art current sharing circuits fail to promote current sharing, since the PWM controllers are not operating in regulation. The regulator with the fastest soft start rate will, therefore, attempt to provide the total load current and either trigger an over current condition or cause system failure.

A need exists, therefore, for a current sharing control circuit that promotes current sharing at any stage of operation from start up to power off.

DETAILED DESCRIPTION OF THE DRAWINGS

Figure 1:
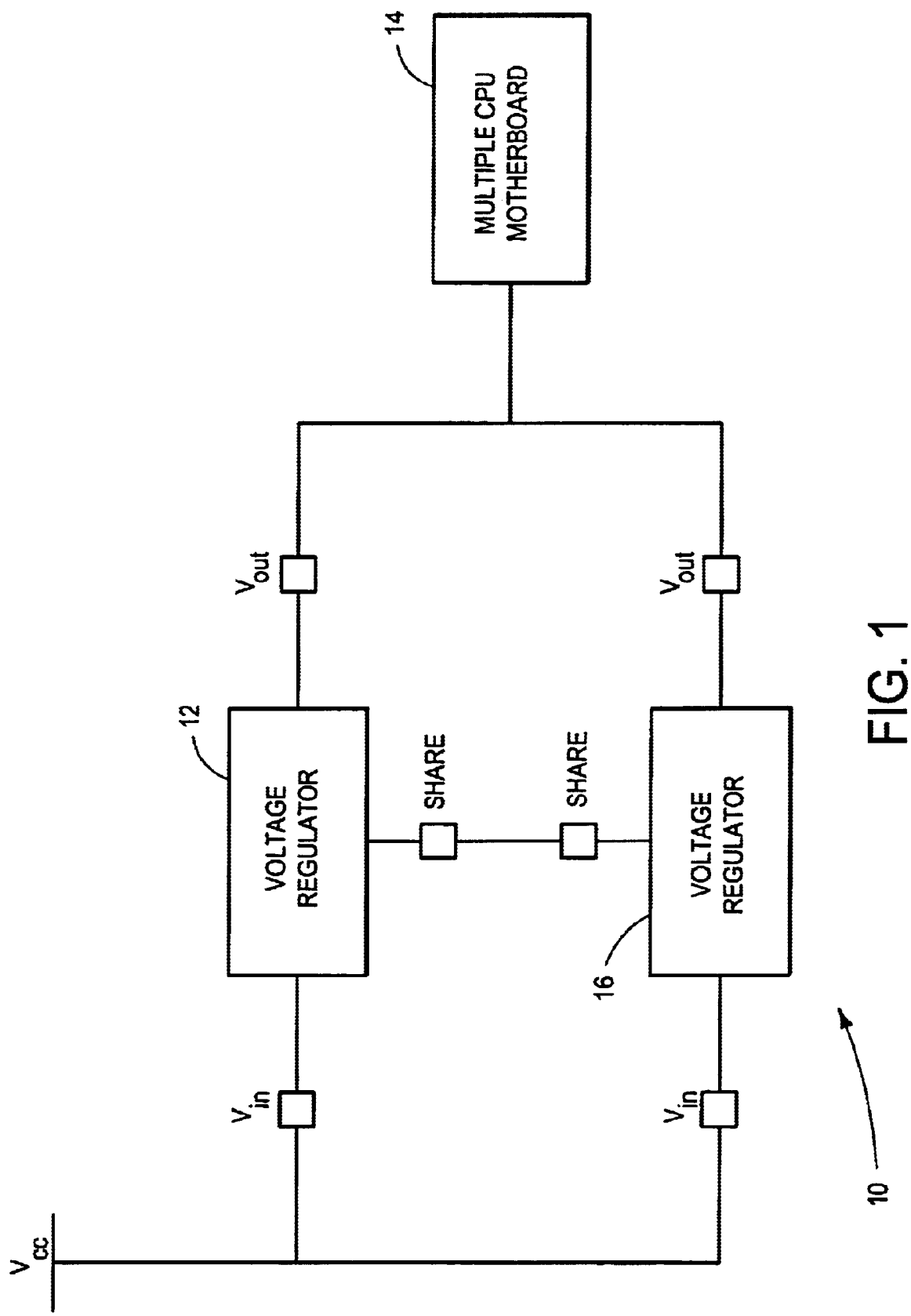
FIG. 1 is a block diagram of dual voltage regulators combined in parallel to supply current to a multiple CPU motherboard.

FIG. 1 illustrates a top level application diagram illustrating voltage regulators 12 and 16, arranged in parallel, to supply power to motherboard 14. Voltage regulators 12 and 16 promote current sharing based on the voltage applied to the SHARE terminal as compared with an internally generated current sense voltage. Specific current share control operation will be discussed hereinafter. Current sharing between voltage regulators 12 and 16 balances the output currents of voltage regulators 12 and 16, such that the output current of regulator 12 is within, for example, +/−10% of the output current provided by regulator 16. FIG. 1 depicts two voltage regulators in parallel supplying power to a load 14, but it should be noted that multiple regulators may be placed in parallel according to the power requirements of the load. For example, load 14 may require 240 amps of operating current. Voltage regulators 12 and 16, for example, are rated at 60 amp output current drive, supplying only half of the required current to load 14. Two additional voltage regulators, therefore, may be combined in parallel with common connected SHARE terminals to provide the additional 120 amps required by load 14.

Figure 2:
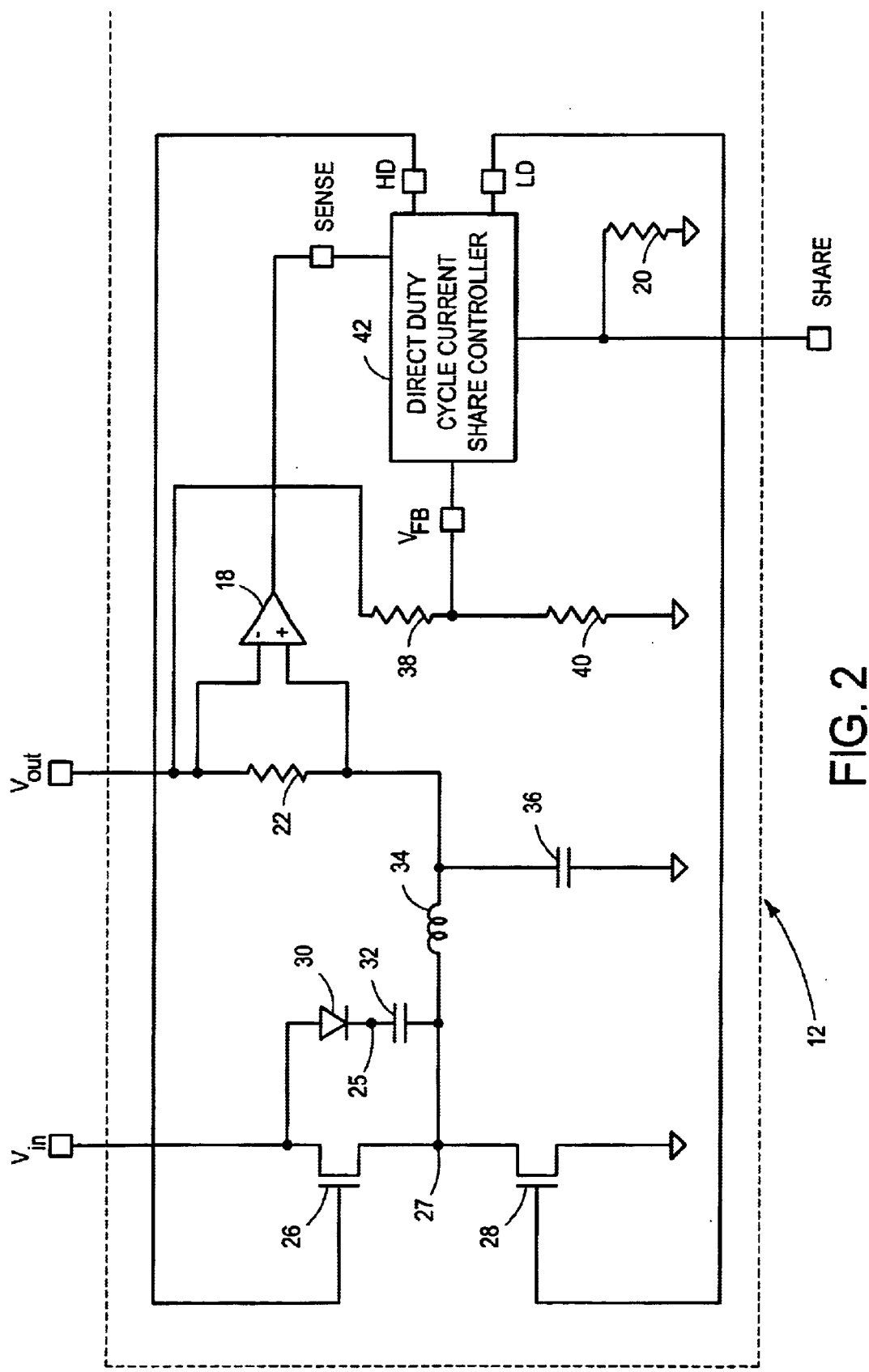
FIG. 2 is a detailed schematic diagram of the voltage regulators of FIG. 1.

FIG. 2 illustrates a detailed schematic of one implementation of voltage regulator 12, which is assumed to be identical to voltage regulator 16, but is not necessarily so. N-type MOSFET transistors 26 and 28 are connected in series with the source terminal of transistor 26 coupled to the drain terminal of transistor 28. The drain terminal of transistor 26 is coupled to the top rail voltage supply $V_{in}$. The source terminal of transistor 28 is coupled to the bottom rail supply voltage, for example, ground potential. The anode of diode 30 is coupled to the drain terminal of transistor 26. The cathode of diode 30 is coupled to a first terminal of capacitor 32. The second terminal of capacitor 32 is coupled to node 27 and to the first terminal of inductor 34. The second terminal of inductor 34 is coupled to a first conductor of capacitor 36, a first terminal of resistor 22 and to the non-inverting input of current sense amplifier 18. The second terminal of capacitor 36 is coupled to the bottom rail voltage supply, for example, ground potential. The second terminal of resistor 22 is coupled to the $V_{out}$ terminal and to the inverting input of current sense amplifier 18. The output of current sense amplifier 18 is coupled to the SENSE terminal of direct duty cycle current share controller (DDCCSC) 42. The first terminal of resistor 38 is coupled to the $V_{out}$ terminal. The second terminal of resistor 38 is coupled to a first terminal of resistor 40 and to the $V_{FB}$ terminal of DDCCSC 42. The second terminal of resistor 40 is coupled to the bottom rail voltage supply, for example, ground potential. DDCCSC 42 provides a high drive signal at terminal HD and a low drive signal at terminal LD. The HD terminal is coupled to the gate terminal of transistor 26 and the LD terminal is coupled to the gate terminal of transistor 28. A first terminal of pull down resistor 20 is coupled to the SHARE terminal and the second terminal of resistor 20 is coupled to, for example, ground potential.

Voltage regulators 12 and 16 are employed to convert an input DC voltage $V_{in}$ to an output DC voltage $V_{out}$ which is at a lower potential than $V_{in}$, thus characterizing voltage regulators 12 and 16 as buck voltage converters. Voltage regulators 12 and 16 operate in a switched mode of operation whereby the conduction states of MOSFET 26 and 28 are controlled by the high drive and low drive signals transmitted by DDCCSC 42, respectively. The high drive and low drive signals are Pulse Width Modulated (PWM) drive signals, which operate in accordance with the power required by a load coupled to terminal $V_{out}$. MOSFET 26 conducts current during a logic high state of the high drive signal, or on-time, and MOSFET 28 conducts current during a logic low state, or off-time, of the high drive signal. The ratio of on-time to off-time in one cycle of the high drive signal is called the duty cycle. The duty cycle is increased when the load demands more power and the duty cycle is decreased when the load demands less power. The duty cycle is characterized to operate within a minimum duty cycle at minimum load and a maximum duty cycle at maximum load. The high and low drive signals transmitted by DDCCSC 42 operate mutually exclusively from each other. In other words, the gate drive signals to MOSFET 26 and 28 operate such that when transistor 26 is in a conductive state, transistor 28 is non-conductive and when transistor 26 is non-conductive, transistor 28 is in a conductive state.

In operation, voltage regulator 12 senses a feedback voltage, which is representative of the voltage at terminal $V_{out}$, through a voltage divider network implemented by resistors 38 and 40. When the voltage sensed by voltage regulator 12 is below a predetermined level, the duty cycle of the high drive signal is increased and the power delivered to load 14 is increased. Conversely, when the voltage sensed by voltage regulator 12 is above a predetermined value, the duty cycle of the high drive signal is decreased and the power delivered to load 14 is decreased. Current sense resistor 22 and difference amplifier 18 are employed to provide output current source information to the SENSE terminal of DDCCSC 42. Difference amplifier 18 senses the voltage drop across resistor 22 and provides a current sense voltage indicative of the voltage drop across resistor 22. Difference amplifier 18 is internally compensated to provide a stable representation of the current delivered to terminal $V_{out}$.

At startup, the voltage at node 27 is at ground potential and the voltage at node 25 is substantially equal to $V_{in}$. Since the voltage at node 27 is substantially at ground potential, the voltage sensed by voltage regulator 12 is also at ground potential, which increases the duty cycle of the high drive signal. As the high drive duty cycle increases, capacitor 36 begins to charge, thereby increasing the voltage at terminal $V_{out}$. Once the voltage sensed by voltage regulator 12 at node $V_{FB}$ has reached a predetermined value, the high drive duty cycle is decreased and the charge across capacitor 36 is discharged by the load connected to terminal $V_{out}$. The voltage at node 25 is substantially equal to the sum of $V_{in}$ and the voltage developed across capacitor 32 which is initialized to $V_{in}$. The voltage at node 25, therefore, is approximately equal to $2*V_{in}$. The voltage across capacitor 32 floats between a minimum voltage of $V_{in}$ and a maximum voltage of approximately $2*V_{in}$. Diode 30 reverse biases once the voltage at node 25 exceeds $V_{in}$, allowing the voltage at node 25 to float above $V_{in}$.

Inductor 34 and capacitor 36 combine to form an integrating function, which integrates the voltage, delivered by transistor 26 at node 27. The high drive signal is a PWM signal, which causes transistor 26 to transition between conductive and non-conductive states. The voltage at node 27 during a conductive state of transistor 26, is substantially equal to $V_{in}$. The voltage at node 27, during a non-conductive state of transistor 26, is substantially equal to ground potential, since the low drive signal is asserted causing transistor 28 to transition to a conductive state. The voltage at node 27, therefore, toggles between substantially $V_{in}$ and ground potential at a rate set by the high drive signal. Since inductor 34 and capacitor 36 combine to form an integrating function, the voltage at terminal $V_{out}$ can be characterized by the integral of the voltage at node 27. The integral of the voltage at node 27 is substantially equal to $V_{in}*$Duty Cycle, where Duty Cycle=$T_{on}/(T_{on}+T_{off})$, $T_{on}$ is the on time of transistor 26 and $T_{off}$ is the off time of transistor 26. The voltage at terminal $V_{out}$, therefore, can be regulated by DDCCSC 42, by adjusting the duty cycle of the high drive signal. Inductor 34 stores magnetic energy during the charging cycle, $T_{on}$, of capacitor 36. Transistor 28 transitions to a conductive state during the non-conductive state of transistor 26, $T_{off}$, due to the low drive signal. During the discharging cycle, $T_{off}$, inductor 34 dissipates stored magnetic energy through transistor 28. An impedance equal to the sum of the on resistance, $R_{ds-on}$, of transistor 28 and the load resistance presented to terminal $V_{out}$, is presented to inductor 34 when transistor 28 is in a conductive state, allowing inductor 34 to dissipate stored energy during the discharging cycle, $T_{off}$, of DDCCSC 42.

Voltage regulator 12 is intended to operate in parallel with other voltage regulators to supply power to a common load. $V_{cc}$ is applied to the $V_{in}$, terminal of voltage regulator 12. As potential develops at terminal $V_{out}$ of voltage regulator 12, current drive information is provided to the SENSE terminal of DDCCSC 42. The SHARE terminal of voltage regulator 12 and the SHARE terminals of parallel coupled voltage regulators are coupled together. Resistor 20 provides typically 60 kilohm (Kohm) of resistance to ground at terminal SHARE. Parallel connecting two voltage regulators results in 30 Kohms to ground, three regulators in parallel provides 20 Kohms to ground, etc. The SHARE terminal voltage drive of DDCCSC 42 can typically support up to 10 parallel coupled voltage regulators. Parallel voltage regulators combine to provide regulated power to load 14 and in addition, through monitoring of respective SHARE terminals, promote current sharing such that the current provided by all parallel coupled voltage regulators are substantially balanced to within +/−10%. FIG. 2 depicts a buck voltage regulator 12 utilizing DDCCSC 42 to promote current sharing. It should be noted, however, that DDCCSC 42 may be used in a multitude of regulator applications utilizing PWM techniques to regulate output power and is not limited for use with buck voltage converters.

Figure 3:
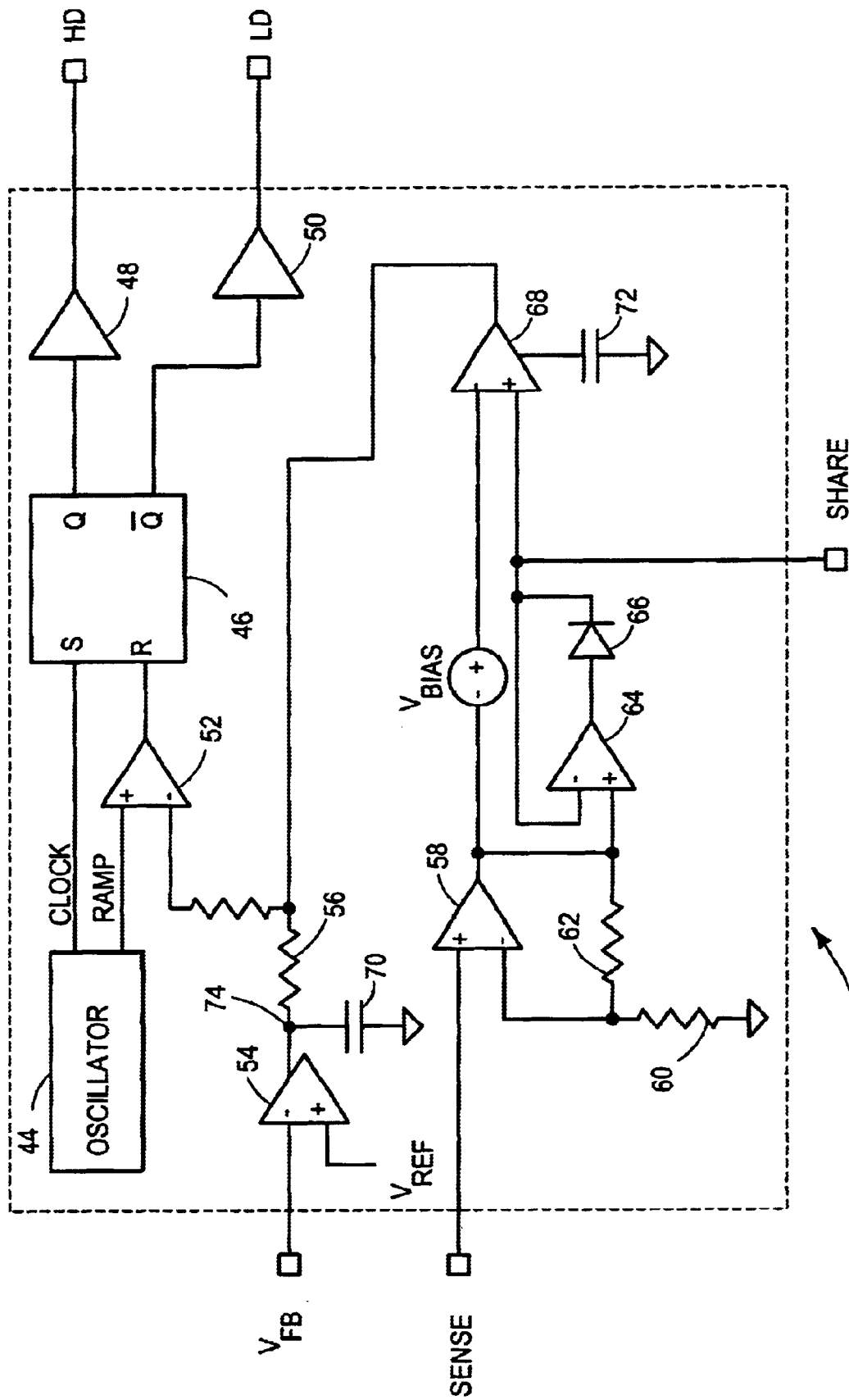
FIG. 3 is a detailed schematic diagram of the direct duty cycle current share controller of FIG. 2.

FIG. 3 illustrates a detailed schematic of DDCCSC 42. DDCCSC 42 can be implemented as an integrated circuit (IC) providing 4–5 external pins. The $V_{FB}$ pin receives feedback information, for example, from a buck voltage regulator as discussed herein and shown in FIG. 2. The SHARE pin is coupled to all SHARE pins of parallel connected voltage regulators as depicted in FIG. 1. The SENSE terminal is connected to a current sense network delivering instantaneous current drive information as shown in FIG. 2, for example. The high drive and low drive signals are presented at pins HD and LD, respectively, for use with a buck voltage converter. A single drive pin, however, may be used for flyback voltage converters, for example, which require only a single drive signal.

Oscillator 44 is coupled to the set input of RS flip flop 46 and the non-inverting input of comparator 52. The output of comparator 52 is coupled to the reset input of RS flip flop 46. The Q output of RS flip flop 46 is coupled to the input of driver 48 and the Q-compliment output of RS flip flop 46 is coupled to the input of driver 50. The output of drivers 48 and 50, are coupled to the HD and LD terminals, respectively. The inverting terminal of transconductance error amplifier 54 is coupled to the feedback pin $V_{FB}$. The non-inverting input to error amplifier 54 is coupled to a reference voltage $V_{ref}$. The output of error amplifier 54 is coupled to a first terminal of capacitor 70 and a first terminal of resistor 56. Capacitor 70 may be provided externally which increases the pin count of IC 42, but allows external loop control. The second terminal of capacitor 70 is coupled to, for example, ground potential. The second terminal of resistor 56 is coupled to the inverting input of comparator 52 and to the output of share adjust amplifier 68. The non-inverting input to current sense amplifier 58 is coupled to the SENSE terminal. The inverting input to current sense amplifier 58 is coupled to the first terminal of resistor 60 and the first terminal of resistor 62. The output of current sense amplifier 58 is coupled to the negative input of $V_{bias}$, the non-inverting input of share bus amplifier 64 and the second terminal of resistor 62. The positive terminal of $V_{bias}$ is coupled to the inverting input of share adjust amplifier 68. The second terminal of resistor 60 is coupled to, for example, ground potential. The inverting input of share bus amplifier 64 is coupled to the non-inverting input of share adjust amplifier 68, the cathode of diode 66 and the SHARE terminal. The output of share bus amplifier 64 is coupled to the anode of diode 66. A first terminal of capacitor 72 is coupled to a compensation input to share adjust amplifier 68 and the second terminal of capacitor 72 is coupled to, for example, ground potential. Capacitor 72, can be supplied externally to DDCCSC 42, which would increase the pin count of IC 42, but would allow external loop control.

In operation, DDCCSC 42 provides PWM drive control and current sharing control. In regulation mode, error amplifier 54, oscillator 44, comparator 52 and RS flip flop 46 combine to form a PWM controller for a buck voltage regulator. Oscillator 44 provides a fixed frequency clock signal to the set terminal of RS flip flop 46. The rising edge of the clock signal at the set input to flip flop 46 causes a logic high output to be presented at the Q output of flip flop 46. As described earlier, the Q output forms the high drive signal which creates a conductive state of transistor 26. A feedback signal is returned to terminal $V_{FB}$, which is proportional to the magnitude of the output voltage delivered to $V_{out}$. The feedback voltage presented to terminal $V_{FB}$ is compared to a predetermined reference signal $V_{ref}$ by transconductance error amplifier 54. Transconductance error amplifier 54 has limited current source and current sink capability and is compensated by capacitor 70. In other words, depending on the relative voltage values presented to the inverting and non-inverting inputs to error amplifier 54, error amplifier slowly charges or discharges capacitor 70 according to its current source or current sink capability, respectively. If voltage $V_{FB}$ is at a potential greater than $V_{ref}$, error amplifier 54 will slowly discharge capacitor 70, decreasing the voltage at terminal 74. Conversely, if voltage $V_{FB}$ is at a potential lower than $V_{ref}$, error amplifier 54 will slowly charge capacitor 70, increasing the voltage at terminal 74. The voltage at node 74 linearly increases as the power demand presented by load 14 increases and the voltage at node 74 linearly decreases as the power demand presented by load 14 decreases.

The error voltage presented to node 74 is also substantially presented to the inverting input of comparator 52 during normal regulation with no current sharing control. Comparator 52 compares the error voltage to a fixed frequency ramp signal generated by oscillator 44. The ramp signal will sweep from a voltage below or equal to the error voltage to a voltage greater than or equal to the error voltage. When the ramp signal is at a potential lower than the error voltage, a logic low will be generated by the output of comparator 52. When the ramp signal is at a potential higher than the error voltage, a logic high will be generated by the output of comparator 52. A logic high presented by the CLOCK signal from oscillator 44 starts the charging cycle, Ton, by asserting the set input of flip flop 46, subsequently asserting the high drive signal. A logic high input at the reset input to flip flop 46 cancels the charging cycle, $T_{on}$, subsequently asserting the low drive signal. It can therefore be seen that the pulse width of the high and low drive signals is set by DDCCSC 42 according to the feedback voltage at node $V_{FB}$. When the feedback voltage $V_{FB}$ is lower than the reference voltage $V_{ref}$, an increasing voltage is provided at node 74, which provides for a delayed reset signal from comparator 52, since more time is required for the ramp signal to sweep to a potential greater than the error voltage at node 74. Conversely, when the feedback voltage $V_{FB}$ is higher than the reference voltage $V_{ref}$, a decreasing voltage is provided at node 74, which provides for an accelerated reset signal from comparator 52, since less time is required for the ramp signal to sweep to a potential greater than the error voltage at node 74. The resulting PWM drive signal at the HD terminal provides an increased duty cycle when the feedback voltage $V_{FB}$ is lower than the reference voltage $V_{ref}$ and provides a decreased duty cycle when the feedback voltage $V_{FB}$ is higher than the reference voltage $V_{ref}$. A load requiring more power results in an increased duty cycle high drive signal and a load requiring less power results in a decreased duty cycle high drive signal.

DDCCSC 42 implements a true direct duty cycle current share control function. Current drive information is received at terminal SENSE. Many techniques are currently used to detect current drive of buck voltage converters, one of which is shown in FIG. 2. Current sense resistor 22 develops a voltage drop directly proportional to the current conducted through resistor 22. Difference amplifier 18 provides a compensated, current sense voltage to the SENSE terminal of voltage regulator 12. Since $V_{out}$ is a substantially fixed, regulated voltage, measuring the voltage drop across resistor 22 provides an adequate representation of output drive current, given that the tolerance of resistor 22 is minimized. Resistor 22 is connected serially between the $V_{out}$ terminal and the first terminal of capacitor 36, therefore, a relatively low voltage drop is preferred across resistor 22 to minimize output power loss. The voltage drop across resistor 22 is preferably 20–50 millivolts (mV), yielding a current sense voltage delivered to the SENSE terminal of DDCCSC 42 of approximately 20–50 mV, for example. Current sense voltage indicative of output drive current is presented to the non-inverting input to current sense amplifier 58. The gain of current sense amplifier 58 is set by the ratio of resistors 62 and 60 such that: $V_{out-58}=V_{in-58}(1+R_{62}/R_{60})$, where $V_{out-58}$ is the output voltage of amplifier 58, $V_{in-58}$ is the input voltage to amplifier 58 at the non-inverting input, $R_{62}$ is resistor 62 and $R_{60}$ is resistor 60. The gain of amplifier 58 is therefore equal to $1+(R_{62}/R_{60})$. The gain of amplifier 58 is typically set, such that a 50 mV input voltage to amplifier 58 will yield a 2 volt output voltage from amplifier 58.

Share bus amplifier 64 receives the output of current sense amplifier 58 at the non-inverting input of share bus amplifier 64. Negative feedback from the output of share bus amplifier 64 to the inverting input of share bus amplifier 64, is provided through blocking diode 66. Blocking diode 66 prevents reverse current injection into the output of share bus amplifier 64 from the SHARE terminal. The negative feedback voltage provided by share bus amplifier 64, is such that the feedback voltage attempts to create the same voltage at the inverting input to share bus amplifier 64 as is presented to the non-inverting input to share bus amplifier 64 by current sense amplifier 58. The output voltage of share bus amplifier 64 is provided to the non-inverting input of share adjust amplifier 68. The inverting input of share adjust amplifier 68 receives the output of current sense amplifier 58, voltage shifted by $V_{bias}$. $V_{bias}$ can be generated, for example, by a simple PNP transistor whose emitter is coupled to a current source via a series coupled emitter resistor. The collector of the PNP transistor is connected to, for example, ground potential. The base terminal of the PNP transistor receives the output voltage of current sense amplifier 58 and provides a relative voltage increase, of for example, 30 mV to the inverting input of share adjust amplifier 68. The 30 mV offset is generated by the emitter current of the PNP transistor conducted through the emitter resistor and is generated at the coupling node between the emitter resistor and the current source. $V_{bias}$ follows the potential at the output of current sense amplifier 58 and is therefore fixed at 30 mV, for example, for all output voltages of current sense amplifier 58. The voltage at the inverting input of share adjust amplifier 68 is therefore given by the following equation: $V_{inv\text{-}68}=V_{cs}+V_{bias}$, where $V_{cs}$ is the output voltage of current sense amplifier 58 and $V_{bias}$ is the voltage generated by $V_{bias}$.

The output of share adjust amplifier 68 is provided at the inverting input to comparator 52. The output of share adjust amplifier 68 is source capable only, whereby current sink operation is not possible. Under normal regulation conditions with no current sharing control, the voltage provided by the output of share adjust amplifier 68 is substantially equal to the output of error amplifier 54, such that a minimal voltage drop appears across resistor 56, creating a an equilibrium condition. During share adjust activation under normal regulation conditions, however, share adjust amplifier 68 provides a voltage different from the error voltage presented by error amplifier 54. Resistor 56, therefore, isolates PWM comparator 52 from the error voltage developed by error amplifier 54 and allows the share control voltage from share adjust amplifier 68 to override the PWM feedback path. In addition, resistor 56 provides a smoothing function such that when a step function is created when share adjust amplifier 68 overrides control of comparator 52, a smoother transition is realized. Since the output of error amplifier 54 is source and sink limited, the value of resistor 56 can be as low as 0 ohms, such that the outputs of error amplifer 54 and share adjust amplifier 68 are coupled to the same node. A zero valued resistor 56, however, will cause a sharper step function to appear when transitioning into current share control mode. Share adjust control activates when the output voltage of current sense amplifier 58 is less than VSHARE-$V_{bias}$. $V_{bias}$ presents enough hysteresis voltage into the current sense voltage feedback loop, such that DDCCSC 42 is prevented from oscillating between the equilibrium condition and current share adjust control mode. Oscillating between the equilibrium condition and the current share adjust control mode causes an output ripple voltage to be present at the $V_{out}$ terminal of voltage regulator 12, directly proportional to the oscillation.

Referring to FIG. 1, two voltage regulators are shown connected in parallel having their respective SHARE terminals coupled together. Additional voltage regulators may be connected in parallel as discussed herein, however, only two are depicted in FIG. 1. The operation of current share control is to substantially balance the output current provided by voltage regulator 12 to the output current provided by voltage regulator 16. Two cases are considered for current share control invocation. Current share control during normal regulation and current share control during startup.

Current share control during normal regulation occurs when the voltage $V_{sb}$ at the SHARE terminal of voltage regulator 16, for example, does not equal the current sense voltage $V_{cs}$ at current sense amplifier 58. A voltage differential, therefore, exists at the inputs to share adjust amplifier 68. Consider a situation where the load 14 requires a total of, for example, 90 amps operating current. Normal current drive for voltage regulators 12 and 16, is therefore, for example, 45 amps. The current sense voltage $V_{cs}$ representing a 45 amp current drive is, for example, 2 volts. Under normal regulation conditions, voltage regulators 12 and 16 are supplying 45 amps of current to load 14, however, for example, voltage regulator 12 supplies 50 amps of current and voltage regulator 16 supplies only 40 amps of current. A 10 amp differential between supply current provided by voltage regulator 12 and voltage regulator 16 will invoke current sharing control. Voltage regulator 12 is the master current share controller and voltage regulator 16 is the slave.

Voltage regulator 12 is supplying 50 amps of current to load 14, which corresponds to, for example, a current sense amplifier voltage $V_{cs}$ equal to 2.22 volts output from current sense amplifier 58. The SHARE bus voltage at the SHARE terminal is, therefore, at 2.22 volts, set by the share bus amplifier 64 of master voltage regulator 12. Voltage regulator 16, however, is producing only 40 amps of operating current, which, for example, corresponds to a voltage, $V_{cs}$, of 1.78 volts at the output of current sense amplifier 58 of regulator 16. The non-inverting input to voltage adjust amplifier 68 of voltage regulator 16 is at 2.22 volts, which is set by the share bus amplifier 64 of master voltage regulator 12. A voltage of 1.78 volts exists at the inverting input to share adjust amplifier 68 of voltage regulator 16, which creates a 0.44 volt differential at the input of share adjust amplifier 68 of voltage regulator 16. Share adjust amplifier 68 of voltage regulator 16, senses the 0.44 volt differential voltage between the SHARE terminal and $V_{cs}$ and begins to drive the output voltage of share adjust amplifier 68 upward. Compensation capacitor 72 provides controlled output response of share adjust amplifier 68, such that loop response time can be programmed via capacitor 72. The output of share adjust amplifier 68 rises, placing a differential voltage across resistor 56, thereby overriding normal PWM feedback voltage delivered by error amplifier 54 and driving the inverting input voltage of comparator 52 upward. As discussed before, driving the voltage at the inverting input to comparator 52 upward, results in a delayed reset signal to the reset input of flip flop 46. Delaying the reset to flip flop 46, increases the duty cycle of the high drive signal, thereby, increasing the current drive of voltage regulator 16. Increasing the current drive of voltage regulator 16 increases the output voltage of current sense amplifier 58 of voltage regulator 16. Increasing the output voltage of current sense amplifier 58 drives the inverting input to share adjust amplifier 68 upward, which is the proper error correction required to obtain a zero volt differential voltage at the input to share adjust amplifier 68. An increased duty cycle from voltage regulator 16 will cause the voltage at $V_{out}$ to increase, which causes the duty cycle of master voltage regulator 12 to decrease. Decreasing the duty cycle of master voltage regulator 12 causes the voltage on the SHARE terminal to decrease, since voltage regulator 12 is controlling the SHARE terminal voltage. The current share control loop will stabilize voltage regulator 16 output current drive to the required 45 amps. As the current drive of voltage regulator 16 increases, the current drive of voltage regulator 12 decreases, and the current drive of both voltage regulators will equalize to approximately 45 amps and the SHARE terminal voltage will be substantially stabilized to 2 volts.

A distinct advantage of the direct duty cycle current share control described above is illuminated during start up mode of operation, where voltage regulators 12 and 16 are out of normal regulation. A typical mode of operation of PWM voltage controllers is to provide a soft start mechanism which limits the rate of duty cycle increase of the high drive signal. Limiting the rate of duty cycle increase of the high drive signal limits the rate of output voltage and output current increase at startup. The output voltage, therefore, ramps slowly or soft starts. Typical soft start duration is tens to hundreds of milliseconds. During soft start, error amplifier 54 cannot actively control the error voltage at node 74, until the PWM controlled voltage regulator has reached a normal regulation point, delivering legitimate feedback information to terminal $V_{FB}$. Therefore, attempts to modify either the feedback voltage $V_{FB}$ or reference voltage $V_{ref}$, as is done in the prior art, will prove to be futile. Conversely, direct duty cycle control is demanded by share adjust amplifier 68 under all modes of operation, except for normal regulation. Under normal regulation, normal PWM feedback voltage is used to modulate the pulse width of the high drive signal with minimal current share control being provided by share adjust amplifier 68. During all other modes of operation, however, including soft start, the share adjust amplifier takes direct control over the duty cycle of the high drive signal. The control of output current of the voltage regulator is directly proportional to the voltage at the SHARE terminal being supplied, therefore, a true voltage controlled current source is realized.

By now it should be appreciated that a direct duty cycle current sharing control circuit and method of use has been provided. An advantage is provided such that a direct duty cycle current sharing control is implemented in all modes of operation of a voltage regulator, even during modes where the voltage regulator is not in regulation, such as during soft start. A second advantage exists such that a true voltage controlled current source is developed which provides output drive current directly proportional to voltage drive at the SHARE terminal.

What is claimed is:

1. A direct duty cycle current share controller, comprising:
   a first detector having an output coupled to provide an output signal at a first node representing an absolute power transfer;
   a second detector having an output coupled to provide an error signal at a second node representing a difference between the absolute power transfer and a relative power transfer; and
   a control circuit having a first input coupled to the first and second nodes and having an output coupled to provide an output signal operating substantially in response to the error signal,
   wherein the first detector includes an amplifier having a first input coupled to receive a first feedback signal, a second input coupled to receive a reference signal indicative of an absolute power transfer operating point and an output coupled to provide the output signal.

2. The direct duty cycle current share controller of claim 1 wherein the second detector includes an amplifier having a first input coupled to receive a second feedback signal, a second input coupled to receive a signal indicative of the relative power transfer and an output to provide the error signal.

3. The direct duty cycle current share controller of claim 1 wherein the control circuit includes a comparator having a first input coupled the first and second nodes, a second input coupled to receive an oscillator signal and an output coupled to provide the output signal.

4. A direct duty cycle current share controller, comprising:
   a detection circuit coupled to receive a feedback signal indicative of an absolute power transfer level and an output coupled to control the absolute power transfer level; and
   a regulation circuit having a first input coupled to receive a control signal indicative of a relative power transfer level and a second input coupled to receive the output of the detection circuit and an output coupled to control the absolute power transfer level in response to the relative power transfer level,
   wherein the detection circuit includes an amplifier having a first input coupled to receive the feedback signal, a second input coupled to receive a reference signal and an output coupled to the second input of the regulation circuit.

5. The direct duty cycle current share controller of claim 4 wherein the regulation circuit comprises:
   a comparator having a first input coupled to receive an oscillator signal and a second input coupled to receive the output of the detection circuit;
   an amplifier having a first input coupled to receive the control signal, a second input coupled to receive a feedback signal indicative of a current drive level and an output coupled to the second input of the first comparator; and
   a memory storage device having a first input coupled to receive a clock signal, a second input coupled to receive an output of the comparator.

6. A direct duty cycle current share controller, comprising:
   a first detection circuit coupled to receive a signal indicative of absolute current drive;
   a second detection circuit coupled to receive a signal indicative of relative current drive and the output of the first detection circuit; and
   a control circuit having a first input coupled to receive the output of the second detection circuit and coupled to provide a control signal used to substantially equalize the absolute and relative current drive,
   wherein the first detection circuit includes an amplifier having a first input coupled to a current sense terminal, a second input coupled to receive a feedback signal and an output coupled to provide an amplified current sense signal.

7. The direct duty cycle current share controller of claim 6 wherein the second detection circuit includes an amplifier having a first input coupled to receive the signal indicative of relative current drive, a second input coupled to receive an output of the first detection circuit and an output coupled to the first input of the control circuit.

8. The direct duty cycle current share controller of claim 6 wherein the control circuit comprises:
   a comparator having a first input coupled to receive the output of the second detection circuit and a second input coupled to receive an oscillator signal; and
   a memory storage device having a first input coupled to receive a clock signal and second input coupled to receive an output of the comparator.

9. A method of operating a direct duty cycle current share controller, comprising:
   providing an absolute power transfer operating point;
   monitoring a signal indicative of a relative power transfer operating point; and directly modifying the absolute power transfer operating point to substantially equal the relative power transfer operating point, wherein providing the absolute power transfer operating point includes comparing a feedback signal to a reference signal indicative of the absolute power transfer operating point.

10. The method of claim 9 wherein monitoring the signal indicative of a relative power transfer operating point includes supplying an external voltage indicative of an external current drive level.

11. The method of claim 9 wherein directly modifying the absolute power transfer operating point comprises:

measuring an error operating point between the absolute power transfer operating point and the relative power transfer operating point; and overriding the absolute power transfer operating point with the error operating point.

12. A method of operating a direct duty cycle current share controller operating between first and second duty cycles, comprising:

establishing an absolute power transfer level at a first duty cycle; and directly changing the first duty cycle to the second duty cycle to substantially equate the absolute power transfer level to a relative power transfer level, wherein directly changing the first duty cycle to the second duty cycle comprises;

monitoring a relative power transfer level;

generating an error signal representing a difference between the relative and the absolute power transfer levels; and overriding the first duty cycle with the second duty cycle generated in response to the error signal.

13. The method of claim 12 wherein establishing the absolute power transfer level comprises;

setting an absolute power transfer level operating point with a predetermined reference signal; and establishing the first duty cycle of a drive signal in response to a feedback signal compared with the predetermined reference signal.

* * * * *